2,950,979
CARBON STRUCTURE AND SPRAY NOZZLE FORMED THEREFROM

Kurt Zosel, Mulheim an der Ruhr, and Rudolf Schäfer, Bad Godesberg, Germany, assignors to Studien Gesellschaft Kohle m.b.H., Mulheim an der Ruhr, Germany, a corporation of Germany No Drawing. Filed Sept. 10, 1957, Ser. No. 683,020

Claims priority, application Germany Sept. 11, 1956

6 Claims. (Cl. 106—56)

This invention relates to a novel carbon structure and to a spray nozzle formed therefrom.

The invention more particularly relates to a carbon structure which is highly impermeable, has high electrical and thermal conductivities, high strength, heat and abrasion resistance and which is excellently suited for the construction of a nozzle for spraying molten metals.

As a result of the increasing demands for organic aluminum compounds, as for example, for use as catalyst components for polymerization processes, it has become necessary to convert large quantities of aluminum into a highly reactive form. Of the known processes for this purpose, the spraying of molten aluminum has achieved particularly great importance. In general, the molten aluminum is allowed to discharge from a nozzle and is atomized by means of a stream of gas with the atomization being preferably effected directly into a liquid which contains a certain amount of aluminum alkyls.

The melting point of aluminum is 658° C. so that the above described process is effected in an apparatus which is maintained at red heat. In actual practice, operation is generally effected at a temperature considerably above the melting point, since if it were attempted to operate precisely at the melting point, slight variation in temperature would cause the nozzle to become rapidly clogged with solidified aluminum. Very often, the nozzles are subjected to temperatures of about 800° C.

Under these extreme conditions, difficulties are encountered in the nozzle which is the most sensitive part of the entire setup with respect to the constructional material. A very large number of materials are not resistant to molten aluminum at high temperatures, as for example, at temperatures up to about 800° C. Many metals will form alloys with the aluminum at these temperatures and many ceramic materials are attacked by aluminum or aluminum oxide. Most of the conventional materials which are used for the nozzles therefore, are rapidly attacked, quickly break down. Thus far, the best results have been obtained with the use of grey cast iron which has been subjected to a preliminary treatment by heating at moderate temperatures at a long period of time. Even these nozzles, however, soon become corroded by the molten aluminum and only have a short operational life. When the nozzles break down, same must be removed from the hot apparatus and a new nozzle inserted, which is an extremely difficult operation and which causes uneconomical shutdowns in operation.

One object of this invention is a new material which may be used for the production of spray nozzles as for example for spraying aluminum in the above mentioned process without the above mentioned difficulties. These and still further objects will become apparent from the following description:

In accordance with the invention, it has been found that carbon, in an artificially produced form, as for example, in the form of graphite which has been impregnated with a molten metal, forms a structurally coherent body which has high impermeability to gases and extremely high strength, abrasion resistance, high electrical and thermoconductivity, and which is excellently suitable for forming spray nozzles which may be used for spraying molten metal such as aluminum.

When producing the material for the construction of spray nozzles, the molten metal used for the impregnation should have a higher melting point than the melting point of the material to be sprayed.

The carbon in the artificially produced form is preferably in the form of graphite, and the metal, as for example, in connection with spray nozzles used for spraying aluminum, is preferably copper or silver. The metal content of the impregnated artificially produced carbon can be 20% or more.

The novel carbon structure, in accordance with the invention, may be produced, for example, by thoroughly heating amorphous carbon, as for example, to a temperature of about 1200° C., and thereupon contacting the same with molten metal, as for example, copper or silver, in amount sufficient to fill the pores and capillaries of the carbon and form a coherent structure upon cooling, which is firmly interlocked with the carbon structure.

When starting with electro graphitized carbon, graphiting is preferably effected at temperatures of about 2,500° C., after which impregnation is effected with the molten metal in the manner described above.

After the formation of the carbon structure in this manner, the nozzles may be prepared therefrom in the conventional manner, as for example, by turning on a lathe, and drilling. The nozzles may have the conventional and well known structural appearance.

The favorable properties of the new nozzles result from the special properties of the metal impregnated carbon. The said carbon is characterized by a high impermeability to gases, an electro and thermoconductivity which is about five to ten times higher than that of unimpregnated carbon of a corresponding quality and strength. In addition, the material has a higher resistance to abrasion and a greater hardness and density than unimpregnated carbon of corresponding quality.

The new nozzles, upon the spraying of molten aluminum, for example, have an almost unlimited life, and thus allow entirely undisturbed, untroubled operation, over an extremely long period of time, as for example, in the production of organic aluminum compounds. As a result of this substantial advance, it is possible to convert any desired quantities of aluminum into a highly reactive atomized state in a short period of time and at extremely low cost.

The following example is given by way of illustration and not limitation:

Example 1

Amorphous carbon is thoroughly heated to about 1200° C. Thereafter, same is intimately mixed with about 20% by weight of molten copper. After cooling, a structurally coherent body is formed in which the copper fills the pores and capillaries of the carbon, and forms a coherent structure firmly interlocked with the carbon. This body was turned down on a lathe and drilled in the form of a spray nozzle for spraying atomized aluminum. The nozzle showed almost unlimited life in operation.

Example 2

Example 1 was repeated using silver in place of copper and similar analogous results were obtained.

Example 3

Electro-graphited carbon was formed at a temperature of about 2,500° C., and thereafter, mixed with about 20% by weight of molten copper. After cooling, a coherent body was formed which had high impermeability to gases, a high electrical and thermoconductivity, high strength, high abrasion resistance and increased hardness and density.

We claim:

1. A spray nozzle for spraying molten metals formed of graphite impregnated with a metal having a higher melting point than aluminum, thereby forming a structurally coherent impervious body.

2. Spray nozzle, according to claim 1, in which said metal is a member selected from the group consisting of silver and copper.

3. Method for the preparation of spray nozzles, which comprises forming a structural mass of carbon by heating amorphous carbon at a temperature of about 1200° C., contacting the heated carbon with an amount of liquid metal having a melting point above that of aluminum sufficient to impregnate said carbon, allowing the mass to solidify and forming the spray nozzle therefrom.

4. Method according to claim 3 in which said metal is a member selected from the group consisting of copper and silver.

5. Method for the preparation of a spray nozzle, which comprises forming a structural mass of carbon by heating electro-graphited carbon to a temperature of about 2,500° C., contacting the heated carbon with an amount of a liquid metal having a melting point above that of aluminum sufficient to impregnate the carbon, allowing the mass to solidify and forming the spray nozzle therefrom.

6. Method according to claim 5, in which said metal is a member selected from the group consisting of silver and copper.

References Cited in the file of this patent

UNITED STATES PATENTS

| | | |
|---|---|---|
| 1,374,909 | De Bats | Apr. 19, 1921 |
| 2,333,387 | Parvin | Nov. 2, 1943 |
| 2,415,196 | Steinberg et al. | Feb. 4, 1947 |